Jan. 9, 1923. 1,441,312
W. H. TURTON.
TIRE HOLDER AND LOCKING BAR.
FILED DEC. 8, 1919. 2 SHEETS-SHEET 1
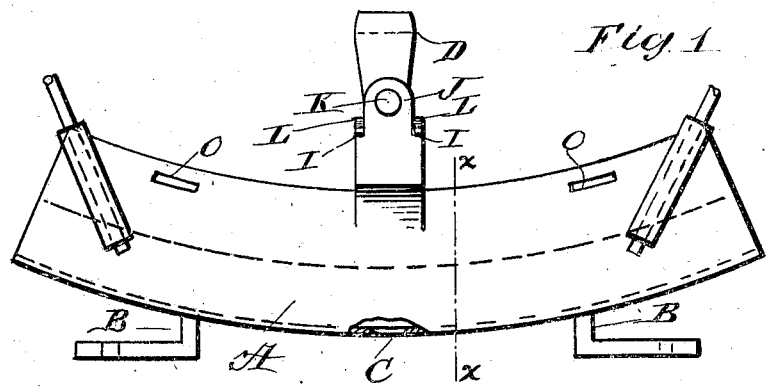
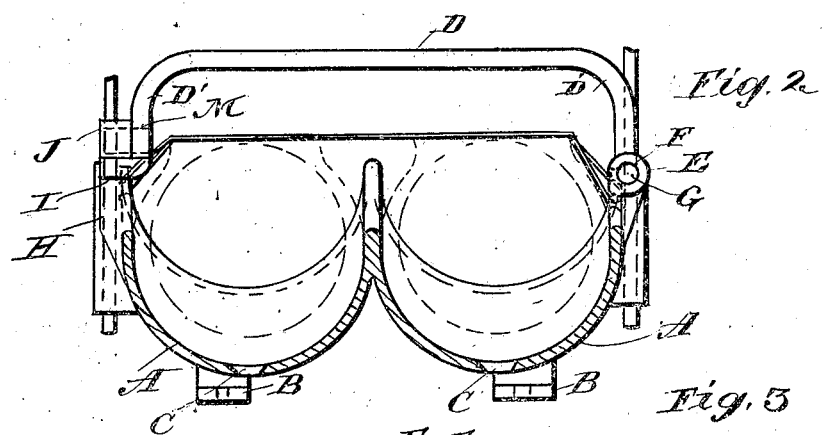
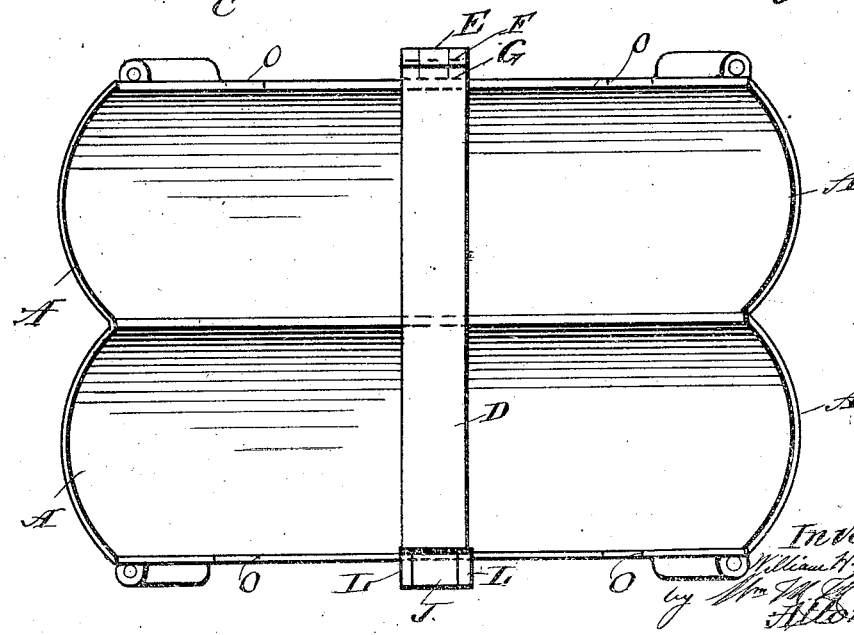

Jan. 9, 1923.
W. H. TURTON.
TIRE HOLDER AND LOCKING BAR.
FILED DEC. 8, 1919.
1,441,312
2 SHEETS-SHEET 2
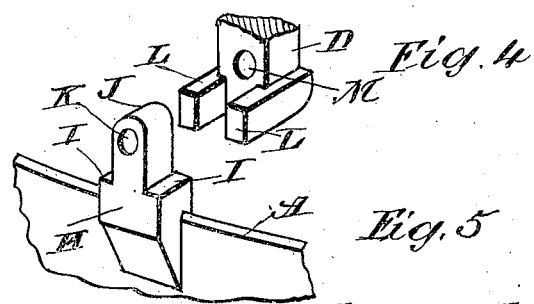
Fig. 4
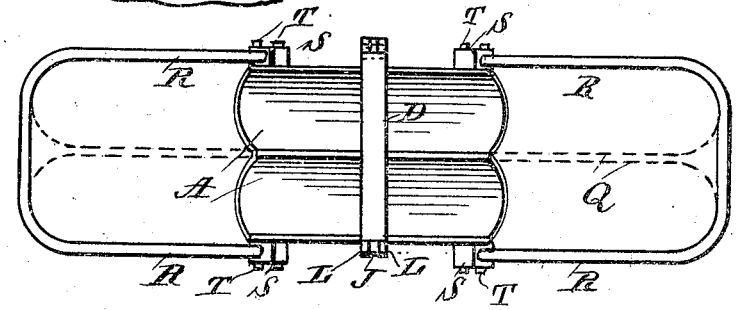
Fig. 5
Fig. 6
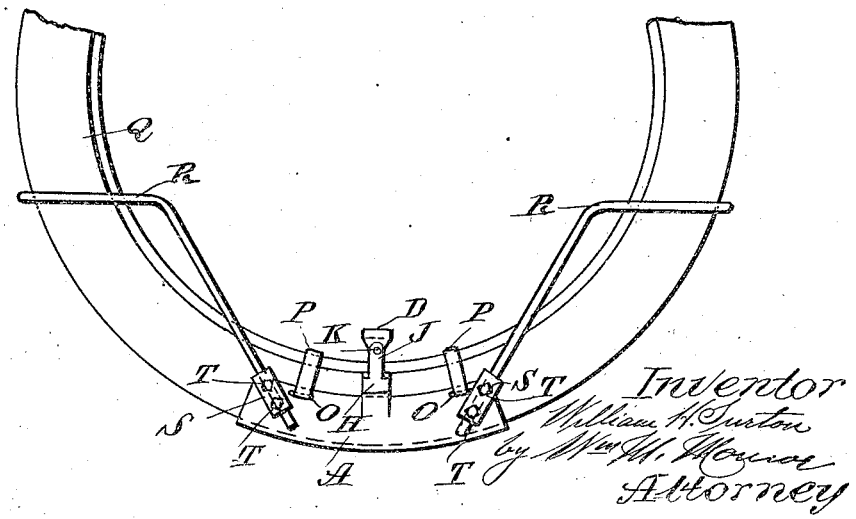
Inventor
William H. Turton
by Wm. M. Mosner
Attorney Patented Jan. 9, 1923.

1,441,312

UNITED STATES PATENT OFFICE.

WILLIAM H. TURTON, OF CLEVELAND, OHIO.

TIRE HOLDER AND LOCKING BAR.

Application filed December 8, 1919. Serial No. 343,368.

*To all whom it may concern:*

Be it known that I, WILLIAM H. TURTON, a citizen of the United States, and resident of Cleveland, in the county of Cuyahoga and State of Ohio, have invented certain new and useful Improvements in Tire Holders and Locking Bars, of which I hereby declare the following to be a full, clear, and exact description, such as will enable others skilled in the art to which it appertains to make and use the same.

The objects of this invention are to provide a holding and clamping device for the extra tire or tires ordinarily carried upon the running board or other convenient part of an automobile and the particular objects are to provide a device composed of materials of different relative density which when closely approximated in position to enclose and hold the tire will not rattle or grate upon each other or make any disagreeable sound whatever when roughly jarred upon the road.

Further features of the invention relate to a suitable seat in which the tire can rest and which conforms to the shape thereof so as not to injure the tire and to additional means for securing the tire therein, and for retaining it in an upright position, so as to preserve the shape and circular appearance of the tire.

The invention also includes a clamping means adapted to secure more than one size of tire upon the seat, and a fastening means that produces a comparatively tight joint, so as to prevent relative movement and consequent wear of the engaging parts.

The device is also designed to be self draining so as to prevent the tire from rotting, which would occur if the tire or casing were permitted to lie in water or grease.

The invention further comprises the combination and arrangement of parts and construction of details hereafter described; shown in the accompanying drawings and specifically pointed out in the claim:

In the accompanying drawings, Fig. 1 is a side elevation of the device enlarged. Fig. 2 is a transverse section on line $x$—$x$ Fig. 1; Fig. 3 is a plan of the device;

Fig. 4 is a perspective showing the engaging parts of the seat and lock bar. Fig. 5 is a plan of the complete device and Fig. 6 is a side elevation thereof.

In these views A represents two trough shaped seats having upwardly turned ends, forming arcs of circles and conforming to the longitudinal and transverse curvature of the tires, to be placed therein.

Feet B, B, are provided with bolt openings or other means for attaching the seats to the running board or other convenient part of the car, and raise the seats slightly above their support to permit of perfect drainage underneath the seats, also each seat is provided with an opening C through which all moisture will drain out of the depressions of the seats, and thus protect the tires which would decay if allowed to stand in moisture for long periods of time. When the tires are placed in the seats, A, A, a locking bar D is dropped down over them, and securely fastened in place.

A bar is provided with arc shaped ends D', D', which raise it above the upper edge of the seats to make room for the tires, the lower halves of which are encircled by the sides of the seats A.

A bracket E extending laterally from the rear side of the device is provided with hinge openings F and one end of the lock bar is pivoted by means of a pin G in said openings.

The other extremity of the lock bar has an interlocking engagement with the front of the seats in the following manner. A bracket H secured to the side of the outer seat is provided with two horizontal seats I, I, and with an intermediate raised member J, in which is a horizontal opening K.

The outer extremity of the locking bar D is provided with two spaced laterally and forwardly projecting lugs L, L, which rest upon the aforesaid shoulders and the downwardly turned extremity of the bar slides against the rear face of the member J.

A horizontal opening M in the extremity of the bar then is in alignment with the opening K in the member J and the link of a padlock is inserted through both openings, thus preventing irresponsible parties from tampering with the lock.

Openings O, O can be formed near the upper marginal edges of the seats, through which traps P can be passed to secure the tires Q firmly in their seats C. These straps are superior to metal fastenings since they do not cause any friction or wear upon the tires.

The hinge joint and interlocking parts of the seats and locking bar are made as tight as possible to prevent their wearing on each other, and the extremities, L, of the lock bar fit tightly against the seats, I below and the upright member J between them, and when the link of the padlock is passed through the parts they are practically immovable in any direction.

To prevent the possibility of a rattling or grating noise of the parts upon each other when worn, the seats are constructed of a soft non-resonant metal such as aluminum, and the locking bar of a harder metal such as brass or bronze, since when the metals rub upon one another no perceptible noise will be produced, or other metals may be employed, one of which is non-resonant, and the metals differing in density of composition.

To prevent the tires from falling apart or sagging in their seats, the metal loops R, R, are passed around their sides above the seats and the lower extremities of the loops are adjustably secured in eyes or lugs S, S, attached to the sides of the seats A, by means of set screws T, T, respectively.

These can be raised or lowered to accommodate the diameter of the tires, and preferably embrace two tires at once, but can be made to support only one if desired. The lugs S are inclined to permit the loops to engage the tires in the most efficient manner.

Having described the invention what I claim as new and desire to secure by Letters Patent is:

A tire holding device comprising, a trough shaped seat member having upwardly curved extremities, supporting lugs depending from the lower end thereof, said seat member provided with a drainage opening, a bracket on the rear side of said seat member, a locking member having a downwardly curved rear end hinged in said rear bracket, a front bracket on said seat member, said bracket provided with lateral shoulders and an upright projection having a horizontal opening, the front extremity of said locking member provided with forwardly and laterally projecting lugs and downwardly turned at its extremity, and having an opening adapted to align with said opening in said upright projection on said front bracket when said lugs engage with said shoulders, and a locking means passing through both said openings.

In testimony whereof, I hereunto set my hand this 4" day of November, 1919.

WILLIAM H. TURTON.

In presence of—
Wm. M. Monroe,
S. W. Sangster.